United States Patent
Ha et al.

(10) Patent No.: US 12,136,499 B2
(45) Date of Patent: Nov. 5, 2024

(54) PoE CABLE

(71) Applicant: LS CABLE & SYSTEM LTD., Anyang-si (KR)

(72) Inventors: Kyung Ho Ha, Daegu (KR); Sang Sik Shin, Daegu (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

(21) Appl. No.: 18/024,212

(22) PCT Filed: Aug. 31, 2021

(86) PCT No.: PCT/KR2021/011695
§ 371 (c)(1),
(2) Date: Mar. 1, 2023

(87) PCT Pub. No.: WO2022/050663
PCT Pub. Date: Mar. 10, 2022

(65) Prior Publication Data
US 2023/0335314 A1 Oct. 19, 2023

(30) Foreign Application Priority Data

Sep. 1, 2020 (KR) .................. 10-2020-0110890
Aug. 31, 2021 (KR) .................. 10-2021-0115373

(51) Int. Cl.
*H01B 11/06* (2006.01)
*H01B 7/02* (2006.01)
(Continued)

(52) U.S. Cl.
CPC .............. *H01B 11/06* (2013.01); *H01B 7/02* (2013.01); *H01B 11/002* (2013.01); *H04L 12/10* (2013.01)

(58) Field of Classification Search
CPC ...... H01B 7/02; H01B 11/002; H01B 11/005; H01B 11/04; H01B 11/06; H01B 11/08; H01B 13/02
(Continued)

(56) References Cited

U.S. PATENT DOCUMENTS 5,493,071 A * 2/1996 Newmoyer ............ H01B 7/295
174/34
5,814,768 A * 9/1998 Wessels ................. H01B 11/02
174/121 A
(Continued)

FOREIGN PATENT DOCUMENTS

KR 1020020044110 A 6/2002
KR 100825408 B1 4/2008
(Continued)

OTHER PUBLICATIONS

International Search Report for related International Application No. PCT/KR2021/011695; action dated Mar. 10, 2022; (7 pages).
(Continued)

*Primary Examiner* — William H. Mayo, III
(74) *Attorney, Agent, or Firm* — K&L Gates LLP (57) ABSTRACT

An Power over Ethernet (POE) which satisfies a Power-over-Ethernet plus (PoE+) power transmission characteristics and a data transmission rate of 1 Gigabits per second (Gbps) without an amplification device, such as an additional hub, at a distance of up to 200 meters, and to which an existing commercial connector is applicable.

5 Claims, 4 Drawing Sheets (51) Int. Cl.
     *H01B 11/00*      (2006.01)
     *H04L 12/10*      (2006.01)

(58) Field of Classification Search
     USPC ....... 174/27, 36, 102 R–113 R, 120 R–121 R
     See application file for complete search history.

(56) References Cited

U.S. PATENT DOCUMENTS

| | | | | |
|---|---|---|---|---|
| 6,153,826 | A * | 11/2000 | Kenny | H01B 11/02 |
| | | | | 174/27 |
| 7,009,105 | B2 * | 3/2006 | Chou | H01B 11/04 |
| | | | | 174/27 |
| 7,109,424 | B2 * | 9/2006 | Nordin | H04B 3/32 |
| | | | | 174/117 FF |
| 10,249,410 | B1 * | 4/2019 | Lanoe | H01B 11/06 |

FOREIGN PATENT DOCUMENTS

| | | | | | |
|---|---|---|---|---|---|
| KR | 1020080101365 | A | | 11/2008 | |
| KR | 20140027693 | A | * | 3/2014 | ............ H01B 11/02 |
| KR | 1020140027693 | A | | 3/2014 | |
| KR | 1020190022104 | A | | 3/2019 | |

OTHER PUBLICATIONS

Written Opinion for related International Application No. PCT/KR2021/011695; action dated Mar. 10, 2022; (7 pages).

\* cited by examiner

PoE CABLE

CROSS-REFERENCE TO RELATED APPLICATIONS

The present application is a National Stage of International Application No. PCT/KR2021/011695 filed on Aug. 31, 2021, which claims the benefit of Korean Patent Application No. 10-2020-0110890, filed on Sep. 1, 2020, and Korean Patent Application No. 10-2021-0115373 filed on Aug. 31, 2021, with the Korean Intellectual Property Office, the entire contents of each hereby incorporated by reference.

FIELD

The present disclosure relates to a power-over-Ethernet (PoE) cable. More specifically, the present disclosure relates to a PoE cable which satisfies a Power-over-Ethernet plus (PoE+) power transmission characteristics and a data transmission rate of 1 Gbps without an amplification device, such as an additional hub, at a distance of up to 200 meters, and to which an existing commercial connector is applicable.

BACKGROUND

An Ethernet-over-Power (PoE) function is a networking function of supplying power and is defined according to the IEEE 802.3af or 802.3at standard. Power can be supplied to a network device for conventional data communication by using an Ethernet cable satisfying a PoE standard and thus use of the Ethernet cable is increasing.

In order to use PoE, both ends of the Ethernet cable may be connected to a power sourcing equipment (PSE) and a power device (PD) to supply power while establishing Ethernet communication.

The PSE may be configured in the form of a network switch or be a PoE injector added to a switch having no PoE function, and the PD may be an equipment for which both power supply and data communication are needed, such as a voice over IP (VoIP) phone, a wireless access point, or an IP camera.

Generally, PoE cables introduced in the past are general-purpose Ethernet cables of Cat.5e or higher, have a conductor size of 23 to 24 AWG, and are used to connect devices within 100 meters by setting a standard distance to 100 meters according to an PoE standard.

However, these PoE cables are not less used because a power transmission distance is limited to 100 meters and thus methods of overcoming the limitation of the power transmission distance of 100 meters have recently been attempted.

For example, for power transmission at a distance of 200 meters according to the IEEE 802.3at standard (referred to as PoE+), a method of configuring a PoE cable and increasing a diameter of a conductor covered with an insulator to reduce a resistance of the conductor or a method of using a power amplification device such as an additional hub in addition to a power sourcing equipment (PSE) or a power device (PD) has been considered.

In relation to the former method of increasing a diameter of a conductor to increase a power transmission distance of a PoE cable, a technique of increasing a size of a conductor to 20 to 22 AWG is disclosed in U.S. patent Ser. No. 10/453,589 and US Patent Publication No. US2020-0043634, but an outer diameter and costs of a PoE cable increase and an RJ45 plug, which is an existing commercial connector, is not applicable to the PoE cable due to the increase in the outer diameter of the PoE cable. Therefore, a dedicated RJ45 plug should be used.

In the latter method of installing an additional hub to increase a power transmission distance of the PoE cable, the additional hub should be installed on a line, and therefore, installation expenses increase, a space for equipment installation should be secured, labor costs and working hours increase, thus resulting in an increase of total costs of a PoE system.

SUMMARY

The present disclosure is directed to providing a Power-over-Ethernet (PoE) cable which satisfies a Power over Ethernet plus (PoE+) power transmission characteristics without an amplification device, such as an additional hub, at a distance of up to 200 meters and to which an existing commercial connector is applicable.

The present disclosure is also directed to providing a PoE cable having PoE+ power transmission capability at a distance of up to 200 meters and satisfying a data transmission rate of 1 Gbps.

The present disclosure is directed to providing a power-over-Ethernet (PoE) cable for connecting a power sourcing equipment and a power device and supplying power while establishing data communication, the PoE cable comprising: a plurality of pair units each formed by twisting a pair of conducting wires to have twist pair pitches, the pair of conducting wires including a conductor with a diameter of 23 AWG and an insulator surrounding the conductor; and an outer jacket surrounding the plurality of pair units, wherein the plurality of pair units are twisted together to have a collective pitch, among the twist pair pitches of the plurality of pair units, a minimum twist pair pitch is in a range of 12 to 15 mm and a maximum twist pair pitch is twice or more the minimum twist pair pitch, and the PoE cable has an outer diameter of 6.2 mm or less.

And the pair of conducting wires may have a conductor resistance of 12.5Ω or less when the PoE cable is 200 m long.

And each of the plurality of pair units may be in contact with a pair unit adjacent thereto.

And the conductor of each of the pair of conducting wires of each of the plurality of pair units may have a diameter of 0.59 mm to 0.61 mm.

And each of the pair of conducting wires of each of the plurality of pair units may have an insulation outer diameter of 1.0 mm to 1.1 mm.

And an average twist pair pitch of each of the plurality of pair units may be in a range of 17 mm to 22 mm.

And a collective pitch of the plurality of pair units may be in a range of 80 mm to 120 mm.

And power consumption of the PoE cable may be 4.5 W or less during transmission of power when the PoE cable is 200 meters long.

According to the present disclosure, a Power-over-Ethernet (PoE) cable, in which an increase in a diameter is minimized and which satisfies Power over Ethernet plus (PoE+) power transmission characteristics at a distance of 200 meters, can be provided without an amplification device such as an additional hub by controlling a conductor of the PoE cable, a diameter of the PoE cable, and a twist pair pitch of each pair unit.

According to the PoE cable of the present disclosure, an increase of an outer diameter of the PoE cable can be minimized and thus a PoE patch cord can be configured by applying an RJ plug which is an existing commercial connector.

In addition, the PoE cable of the present disclosure is capable of satisfying a data transmission rate of 1 Gbps.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 1:
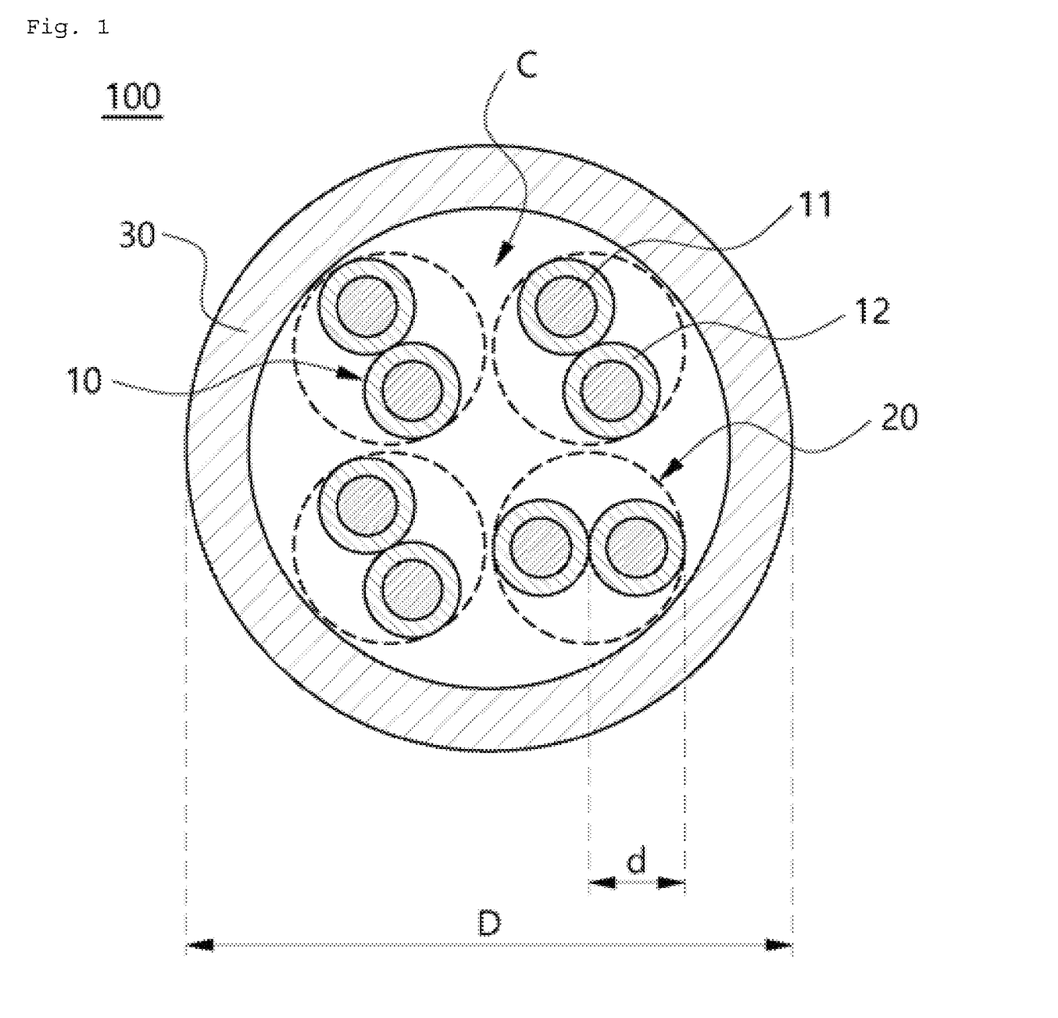
FIG. 1 is a cross-sectional view of a Power-over-Ethernet (PoE) cable according to the present disclosure.

FIG. 1 is a cross-sectional view of a Power-over-Ethernet (PoE) cable 100 according to the present disclosure.

According to the present disclosure, the PoE cable 100 may include: four pair units 20 each formed by twisting a pair of conducting wires 10 to have a twist pair pitch, the pair of conducting wires 10 each including a conductor 11 and an insulator 12 surrounding the conductor 11; and a cable jacket 30 surrounding all the four pair units 20.

In general, an Ethernet cable used as a PoE cable is a local area network (LAN) cable such as an unshielded twisted pair (UTP) cable, a foiled twisted pair (FTP) cable or a shielded twisted pair (STP) cable, and is generally a standard signal line used by being connected to a LAN card.

Such an Ethernet cable may include a core including a plurality of pair units, and a cable jacket surrounding an outside of the core to protect the outside of the core.

The Ethernet cable may be classified as a category (expressed as Cat.) according to a transmission rate (Mbps) and a transmission band (MHz) of a communication signal, and communication cables of Cat.3 to Cat.8 have been introduced. Specifically, a category of a communication cable increases as a transmission rate (Mbps) and a transmission band (MHz) of a signal to be transmitted through the communication cable increase.

An Ethernet cable of Cat.5e has a transmission rate of 400 Mbps and a transmission band of 100 MHz, and an Ethernet cable of Cat.6 has a transmission rate of 1 Gbps and a transmission band of 250 MHz.

Such an Ethernet cable can be used as a PoE cable when it provides a networking function of supplying power as defined in the IEEE 802.3af or 802.3at standard, which is a PoE standard, and the present disclosure relates to a PoE cable for increasing a power transmission distance while minimizing an increase in an outer diameter thereof.

The PoE cable 100 of the present disclosure may be manufactured by forming each of the plurality of pair units 20 by twisting the pair of conducting wires 10, which are each obtained by covering the conductor 11 with the insulator 12, to have a predetermined twist pair pitch, and inserting the plurality of pair units 20 into the cable jacket 30. In this case, the plurality of pair units 20 may be twisted to have different twist pair pitches.

The plurality of pair units 20 may be twisted together to form an aggregate, and a twist pitch used therefor is referred to as a collective pitch.

Here, in the conducting wire 10, the conductor 11 may be formed of a copper material to transmit an electrical signal converted from data, and the insulator 12 may be formed of a polymer that has a low dielectric constant and is easily processible, such as low-density polyethylene (LDPE), high-density polyethylene (HDPE), or flourinated ethylene isoprene (FEP). Because heat may be generated during electrical conduction, a material and a thickness (an insulation outer diameter) may be determined in consideration of flame retardancy.

The PoE cable 100 according to the present disclosure may further include the cable jacket 30 configured to surround the plurality of pair units 20 and form an appearance. Generally, the cable jacket 30 may be formed of an insulating material, such as polyethylene, PVC, or an olefin-based polymer material, and a thickness thereof may be set to 0.4 to 0.5 mm.

The thickness of the cable jacket 30 may be set such that a diameter of the conductor 11 of the PoE cable 100 of the present disclosure is slightly large within a range of 23 to 24 AWG, which is a range of diameters of a conductor of the PoE cable 100 generally used in the related art, an insulation outer diameter d of each conducting wire 10 is in a range of 1.0 mm to 1.1 mm, and a total outer diameter D of the PoE cable 100 is 6 mm or less so as to apply an existing commercial connector.

Here, the cable jacket 30 not only mechanically protects the plurality of pair units 20 but also provides a function of mitigating impacts by securing a distance from alien crosstalk due to electromagnetic wave generated in a cable or electronic equipment adjacent thereto.

In the PoE cable 100 of the present disclosure, a diameter of the conductor 11 and a twist pair pitch are designed to provide a PoE power transmission function of overcoming a distance limitation up to about 100 meters, and a separator disposed at the center of the pair units 20 is omitted to maintain an outer diameter of the PoE cable 100 to be 6.2 mm or less to apply an existing commercial connector.

Specifically, in order to transmit power up to 200 meters through the PoE cable 100 of the present disclosure according to the PoE+ IEEE 802.3at standard, the pair unit 20 may be configured by twisting a pair of conducting wires 10 each including the conductor 11 with a diameter of 23 AWG and the insulator 12 surrounding the conductor 11.

A resistance R decreases sequentially and attenuation decreases (an margin improvement) when the diameter of the conductor 11 of the conducting wire 10 is increased, whereas the resistance R increases, attenuation increases (a margin reduction), and a characteristic impedance value Zo increases when the diameter of the conductor 11 of the conducting wire 10 is reduced.

A capacitance (C) value of a communication cable decreases sequentially, attenuation decreases (an marging improvement), and a characteristic impedance value Zo increases when the insulation outer diameter d, which is the diameter of the conducting wire 10, is increased, whereas the capacitance (C) value increases, attenuation increases (a margin reduction), and the characteristic impedance value Zo decreases when the insulation outer diameter d is reduced.

In addition, a method of increasing the diameter of the conductor 11 to increase a PoE transmission distance is considered as a method of reducing a resistance of the conductor 11, and a twist pair pitch is preferably set to be long to increase the PoE transmission distance, because the resistance of the conductor 11 is proportional to a length of the conductor 11 and the length of the conductor 11 of the PoE cable 100 is inversely proportional to the twist pair pitch.

First, the diameter of the conductor 11 will be described below.

When the diameter of the conductor 11 is 23 AWG, 23 AWG is specified in Table 5 of the UL 444 (Communication Cable) standard and defined as a range of 0.546 mm to 0.610 mm according to the standard. Because a resistance of a conductor of a pair unit of a PoE cable of the present disclosure is a condition for power transmission according to the PoE+ IEEE 802.3at standard when the cable is 200 meters long and is 12.5Ω or less, a diameter of the conductor 11 is preferably in a range of 0.590 mm to 0.610 mm when a margin and the like are considered.

Methods of supplying power through a PoE cable include a method of a model A for supplying both power and data through two pair units and a method of a model B for supplying only power to two pair units that are not used for data communication. The two models have advantages and disadvantages but are the same in that DC power is supplied through a pair of pair units.

The IEEE 802.3af standard, which is an existing PoE standard, defines transmission power for a power sourcing equipment (PSE) as 15.4 W and reception power for a power device (PD) as 12.95 W, so that a maximum supply current may be 350 mA, and as the performance of PDs have been recently improved, more power is requested and thus the PoE+ IEEE 802.3at standard defines maximum transmission power for a PSE as 30.0 W and reception power for a PD as 25.5 W, so that a maximum supply current may be 600 mA.

Therefore, power loss due to a resistance of a conductor of a pair unit or the like should be 4.5 W or less according to the PoE+ IEEE 802.3at standard.

Although the PoE IEEE 802.3af standard and the PoE+ IEEE 802.3at standard are defined with respect to a distance of 100 meters, power can be supplied to up to 200 meters according to the PoE+ IEEE 802.3at standard and thus power loss due to a resistance should be 4.5 W or less even at 200 meters when a supply current is 600 mA.

Therefore, the power loss due to the resistance may be calculated as $P=I^2 \times R$, and a maximum resistance of a conductor of a pair unit of a 200-m cable may be 12.5Ω according to maximum power loss $P_{max}$ of 4.5 W and a supply current I (600 mA) according to the PoE+ IEEE 802.3at standard.

Therefore, even when a 23 AWG conductor is applied, a maximum resistance of the conductor should be 12.5Ω or less to provide a PoE+ function at 200 meters.

A thickness of an insulator and a material such as LDPE, HDPE or FEP may be determined such that an insulation outer diameter d of a conducting wire of a pair unit of a PoE cable according to the present disclosure may be preferably in a range of 1.0 mm to 1.1 mm to set an outer diameter of the PoE cable to 6.2 mm or less and achieve flame retardancy for heat.

As described above, in order to supply power at a distance of 200 meters according to the PoE+ IEEE 802.3at standard, a twist pair pitch is preferably set to be long to minimize a resistance of a conductor of each pair unit.

However, communication characteristics are influenced by a twist pair pitch and thus a twist pair pitch of each pair unit 20 of the PoE cable 100 cannot be set to be long unconditionally. Therefore, for the PoE cable 100 of the present disclosure, it is important to design a twist pair pitch as described below to not only transmit power according to the PoE+ IEEE 802.3at standard up to 200 meters but also satisfy a conventional Ethernet communication function.

In this regard, the PoE cable 100 of the present disclosure is designed such that a minimum twist pair pitch is in a range of 12 mm to 15 mm and a maximum twist pair pitch is twice or more the minimum twist pair pitch among twist pair pitches of the plurality of pair units 20, and an average twist pair pitch may be set to be in a range of 17 to 22 mm greater than 12 to 15 mm, which is a range of conventional average twist pair pitches. The four pair units may be each configured to have one of the twist pair pitches, gathered to have a collective pitch of 80 mm to 120 mm while being arranged such that adjacent pair units are close to or in contact with each other, and covered with the cable jacket 30. A thickness of the cable jacket 30 may be determined such that the PoE cable 100 may have an outer diameter of 6.2 mm or less to be inserted into a cable insertion hole of a general-purpose RJ45 plug.

In the PoE cable of the present disclosure, a separator or the like is not applied between the pair units to connect the PoE cable to the general-purpose RJ45 plug and thus adjacent pair units are disposed in contact with each other, thereby minimizing an increase in a total outer diameter of the cable.

Here, the disposing of the adjacent pair units in contact with each other should not be understood to mean the adjacent pair units are always in contact with each other in the longitudinal direction of the PoE cable but may be understood to mean that the plurality of pair units are in contact with each other in some regions or at least some thereof are in contact with each other when the plurality of pair units are twisted spirally.

Table 1 below briefly shows the specifications of a PoE cable 100 according to an example of the present disclosure and two types of PoE cables 100 of the related art, and a comparison of results of a performance test conducted thereon.

The results of the performance test shown in Table 1 below were measured by the test equipment shown in FIGS. 2 and 3.

Figure 2:
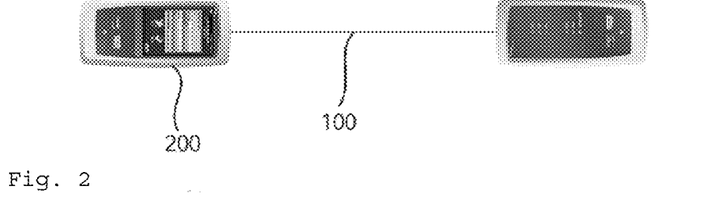
FIG. 2 is a diagram of a test device (Fluke DSX-8000, TP cable analyzer) configured to evaluate a conductor resistance (R), near-end crosstalk (NEXT), and insertion loss (IL) when connected to both sides of a 200-m cable to be tested.

FIG. 2 is a diagram of a test equipment (Fluke DSX-8000, TP cable analyzer) for evaluating a conductor resistance R, near-end crosstalk (NEXT), and insertion loss IL when connected to both sides of a 200-m cable to be tested. FIG. 3 illustrates a system for testing PoE performance by setting a length of a PoE cable between a network switch and an Internet protocol (IP) camera to 200 meters and determining whether the IP camera 200 operates normally.

The conductor resistance R, near-end crosstalk (NEXT), and insertion loss IL were measured by connecting a predetermined length of a PoE cable to be tested to a pair of test equipments shown in FIG. 2.

Figure 3:
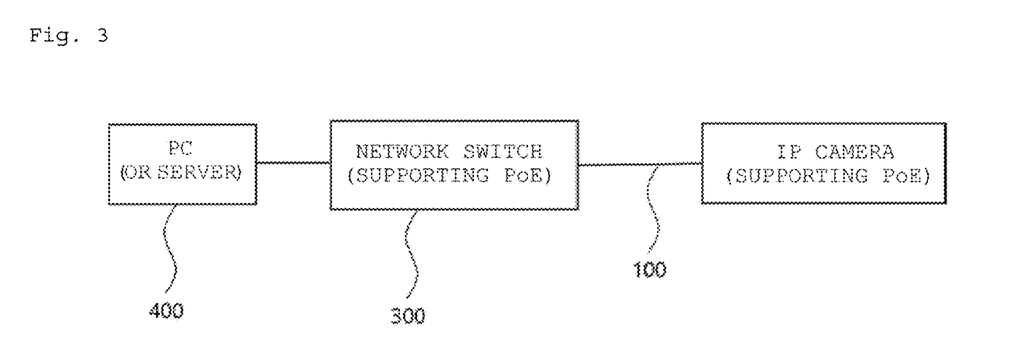
FIG. 3 illustrates a system for testing PoE performance by setting a length of a PoE cable between a network switch and an Internet protocol (IP) camera to 200 meters and determining whether the IP camera operates normally.

By using the system of FIG. 3, a length of a PoE cable for connecting a network switch 300 and an IP camera was set to 200 meters, and an image provided from the IP camera was checked by a PC 400 connected to the network switch 300 or the like to determine whether an IP CCTV camera operated normally. Here, an equipment including eight ports and supporting the PoE+ IEEE 802.3at standard was used as the network switch 300, and power of 30 W or less was transmitted to each port according to the PoE+IEEE 802.3at standard.

A 1080p IR Dome PoE IP camera, which is a 12V DC product capable of capturing full HD (1080p) videos, was used as the IP camera. In addition, whether there is an error during the supply of power or data communication may be determined by the PC 400 by determining whether a video is transmitted normally, identifying a video, or determining whether there is a time delay.

In Table 1 below, Comparative Example 1 is a PoE cable 100 of CAT5e, in which a diameter of a conductor 11 of a conducting wire 10 of each of pair units 20 is 24 AWG, a separator for separating the pair units 20 is omitted at the center of the PoE cable 100, and an outer diameter of the PoE cable 100 is 5.0 mm.

Comparative Example 2 is a PoE cable 100 of CAT6, in which a diameter of a conductor 11 of a conducting wire 10 of each of pair units 20 is 24 AWG, a separator for separating the pair units 20 is provided at the center of the PoE cable 100, and an outer diameter of the PoE cable 100 is 5.8 mm.

An Example of the present disclosure is a PoE cable 100, in which a diameter of a conductor 11 of a conducting wire 10 of each of pair units 20 is 23 AWG, a separator for separating the pair units 20 is provided at the center of the PoE cable 100, the pair units 20 are disposed adjacent to each other, and an outer diameter of the PoE cable 100 is 5.9 mm.

As described above, PoE standards may be classified into the IEEE 802.3af-2003 PoE standard and the IEEE 802.3at-2009 PoE+ standard according to a PoE version, both of which require transmission power of about 13 W (maximum transmission power of 15.4 W for a PSE) and 25.5 W (maximum transmission power of 30 W for the PSE) with respect to a PD at a distance of 100 meters.

Both Comparative Examples 1 and 2 satisfied a transmission power condition for a PD at 100 meters according to the PoE+ IEEE 802.3at standard but did not satisfy the transmission power condition, i.e., 25.5 W (a condition that transmission power for a PSE be 30 W and loss due to a resistance be 4.5 W or less), because as shown in Table 1 above, transmission power for the PD was measured as 24.4 W and 24.93 W in a test at 200 meters longer than the distance according to the PoE+ IEEE 802.3at standard, whereas the Example of the present disclosure satisfied the power transmission condition, i.e., 25.5 W, because transmission power for a PD was measured as 26.25 W.

In the Example of the present disclosure shown in Table 1, a diameter of the conductor 11 was 23 AWG, an average twist pair pitch was set to be longer than a range of 12 mm to 15 mm, which is used conventionally, and a conductor resistance at 200 meters was 12.41Ω.

Here, the conductor resistance at 200 meters is a largest resistance among resistances of a plurality of conducting wires, and in the Example of the present disclosure, all conductor resistances of eight conducting wires constituting the four pair units were 12.5Ω or less.

As described above, a transmission power condition, i.e., 25.5 W, for a PD at 200 meters, power loss of 4.5 W due to a resistance, and a conductor resistance of 12.5Ω at 200 meters may be applied as conditions according to the same standard. Therefore, in Table 1 above, the Example also satisfied a resistance condition according to the IEEE 802.3at POE+ standard.

In the case of Comparative Examples 1 and 2, resistances were measured as 18.52Ω and 16.76Ω at a distance of 200 meters due to a long twist pair pitch and a 24 AWG

TABLE 1

| | conductor diameter [AWG] | separator | cable outer diameter [mm] | twist pair pitch [mm] | 200-m conductor resistance [Ω] | 200 m power consumption ($P = I^2R$) [W] | PD transmission power [W] | PoE CCTV video transmission test |
|---|---|---|---|---|---|---|---|---|
| Comparative example 1 | 24 | X | 5.0 | 11.0/15.0 12.2/17.0 | 18.52 | 5.60 | 24.40 | fail |
| Comparative example 2 | 24 | ○ | 5.8 | 11.0/15.0 12.2/17.0 | 16.76 | 5.07 | 24.93 | fail |
| Example | 23 | X | 5.9 | 12.6/22.8, 14.6/27.1 | 12.41 | 3.75 | 26.25 | pass |

Comparative examples 1 and 2 and the Example each include four pair units 20, only Comparative example 2 of CAT6 includes the separator for separating the pair units 20, and all of Comparative examples 1 and 2 and the Example satisfy a condition that an outer diameter of a cable be 6.2 mm or less. Because the three types of the cables have an outer diameter of 6.2 mm or less, a general RJ45 plug is applicable thereto.

In the Example of the present disclosure, the separator was omitted, but the conductor 11 with a larger diameter (23 AWG) was used and an average twist pair pitch of the four pair units 20 was set to be larger than in Comparative Examples 1 and 2.

conductor, and thus, 12.5Ω, which is a resistance according to the IEEE 802.3at PoE+ standard, was not satisfied at a distance of 200 meters (a distance of 100 meters was not taken into account).

In the Example of the present disclosure, transmission power for the PD at 200 meters was measured as 26.25 W greater than 25.5 W, i.e., power loss due to a resistance even at 200 meters was relatively low, and thus satisfied a power transmission condition for a receiving side according to the IEEE 802.3at PoE+ standard.

Figure 4:
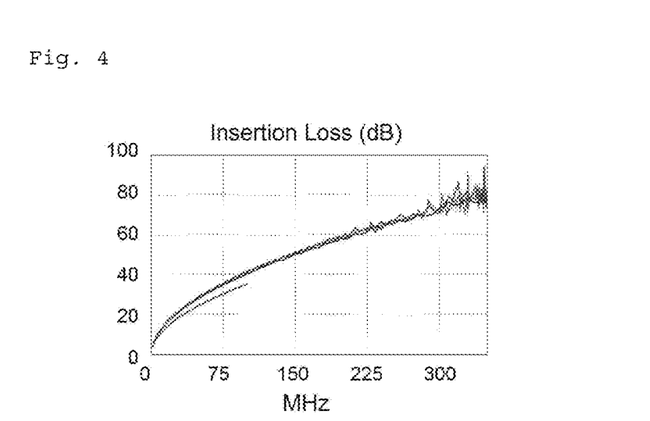
FIGS. 4 to 6 are graphs showing results of an insertion loss test conducted on 200-m cables of Comparative example 1, Comparative example 2, and an Example of the present disclosure.
Figure 5:
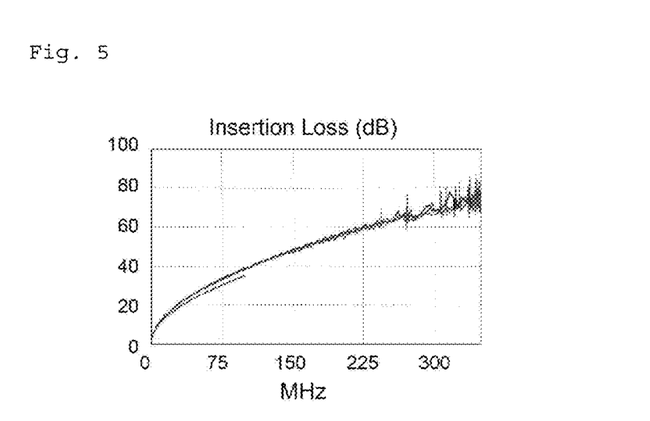
Figure 6:
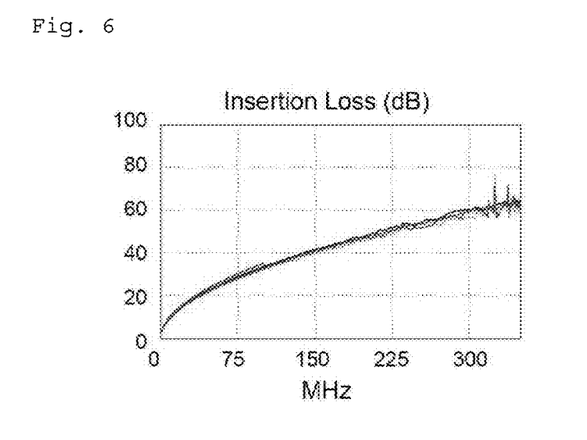

FIGS. 4 to 6 are graphs showing results of an insertion loss test conducted on 200-m cables of Comparative example 1, Comparative example 2, and the Example of the present disclosure.

All signals, including an Ethernet communication signal flowing along a cable, gradually attenuate as they are transmitted away from a source. A reduction of the strength of a signal due to an increase of a distance from a source of signal is referred to as insertion loss or an attenuation rate. Generally, insertion loss increases when a length of the PoE cable 100 laid for a connection is greater than designed.

Although a twist pair pitch is preferably designed as long as possible in terms of power transmission through the PoE cable 100, a twist pair pitch should be accurately designed when insertion loss, near-end crosstalk, etc., which will be described below, are taken into account.

The graphs of FIGS. 4 to 6 show a degree of insertion loss for each pair of data per frequency and a loss limit of data per frequency (indicated by a red line). In both Comparative Example 1 (FIG. 4) and Comparative Example 2 (FIG. 5), degrees of insertion loss measured in all frequency domains were higher than a standard insertion loss level, whereas in the Example of the present disclosure (FIG. 6), a degree of insertion loss was not high but the standard insertion loss level was satisfied with a slight margin.

In terms of insertion loss among communication characteristics, in Comparative Examples 1 and 2, a loss or attenuation rate of transmission data at a distance of 200 meters was high and thus CCTV videos cannot be transmitted normally, i.e., the IEEE 802.3at PoE+ data standard cannot be satisfied.

However, in the Example of the present disclosure, CCTV videos were transmitted normally even at a distance of 200 meters and thus not only a resistance but also insertion loss can be reduced by appropriately selecting a diameter of the conductor 11.

Figure 7:
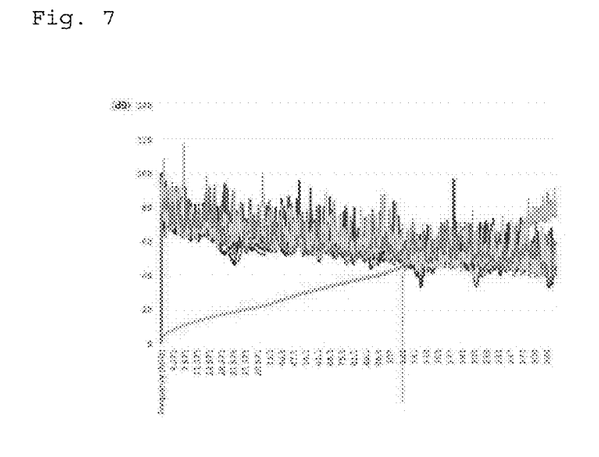
FIGS. 7 to 9 are graphs showing results of testing a relationship between pair-to pair near-end crosstalk (NEXT) and insertion loss of Comparative Examples 1 and 2 and the Example of the present disclosure.
Figure 8:
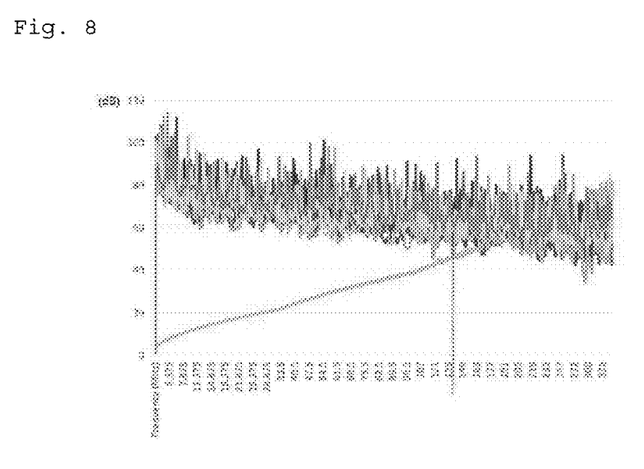
Figure 9:
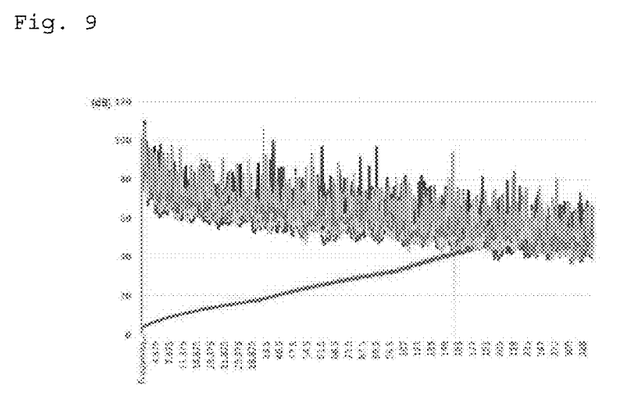

FIGS. 7 to 9 are graphs showing results of testing a relationship between pair-to pair near-end crosstalk (NEXT) and insertion loss of Comparative Example 1, Comparative Example 2, and the Example of the present disclosure.

Near-end crosstalk (NEXT) refers to a signal, excluding noise to be disappeared, transmitted from a line to an adjacent line. Near-end crosstalk (NEXT) is a criterion for identifying a coupling of unnecessary signals generated between adjacent pairs of a communication cable. The performance of the communication cable is better as a coupling rate of such signals decreases. A signal power loss rate (lost signal power/original signal power) is expressed as a dB value, and a signal interferece rate decreases as the dB value increases. A dB value of the near-end crosstalk (NEXT) may decrease when a twist pair pitch of each pair unit 20 of the PoE cable 100 is not maintained or as a frequency band of a ata signal increases.

It may be assumed that both insertion loss and near-end crosstalk (NEXT) are noise generated during the connection of a cable or a circuit, and the difference between insertion loss and near-end crosstalk (NEXT) may be expressed as an an attenuation-to-crosstalk ratio (ACR). The ACR refers to the difference between signal attenuation and near-end crosstalk (NEXT) caused by a conducting wire or a transmission medium, and is a quantitative indicator of a degree to which a signal attenuating at the end of a communication line at a receiving side is stronger than near-end crosstalk (NEXT). Theoretically, a signal can be transmitted normally to a frequency band at which near-end crosstalk (NEXT) and insertion loss intersect each other.

That is, it may be assumed that as the length of the PoE cable 100 is increased and a data frequency increases, communication cannot be performed normally at all channels of data communication lines of the PoE cable 100 due to the sum of losses caused by insertion loss and near-end crosstalk (NEXT).

Thus, in the graphs of FIGS. 7 to 9 showing pair-to pair near-end crosstalk (NEXT) and insertion loss in Comparative examples 1 and 2 and the Example of the present disclosure, videos were transmitted normally at about 121 MHz at 170 meters in the case of Comparative example 1, at about 135 MHz at about 180 meters in the case of Comparative example 2, and at 200 meters in the case of the Example of the present disclosure. Therefore, it can be seen that insertion loss and loss due to near-end crosstalk (NEXT) intersect each other near about 151 MHz at a distance of about 200 meters.

Accordingly, the Example of the present disclosure shows that a communication problem did not occur at frequency bands of about 121 MHz, about 135 MHz, and about 151 MHz when a cable length was 200 meters and thus satisfied not only power transmission capability at 200 meters according to the PoE+ IEEE 802.3at standard but also communication performance equivalent to the PoE cable 100 of CAT6 satisfying a general transmission rate of 1 Gbps.

As shown in Table 1, when a commercial CCTV for which data and power are required to be transmitted at a distance of 200 meters is driven through the PoE cables 100 of Comparative examples 1 and 2 and the Example of the present disclosure, it was difficult to transmit video data and supply driving power normally through Comparative examples 1 and 2 but it was possible to transmit video data and supply driving power even at a distance of 200 meters or more through the PoE cable 100 of the Example of the present disclosure.

In addition, it was concluded that a minimum twist pair pitch of each of the four pair units 20 of the PoE cable 100 of the present disclosure should be in a rang of 12 mm to 15 mm and a maximum twist pair pitch should be twice or more the minimum twist pair pitch, based on a result of testing insertion loss and near-end crosstalk (NEXT) and a combination of various embodiments.

That is, an average twist pair pitch was set to 14 mm or less in the case of Comparative Examples 1 and 2, whereas communication characteristics such as insertion loss or near-end crosstalk (NEXT) were satisfied while reducing a resistance when an average twist pair pitch of the four pair units 20 of the present disclosure was equal to or less than 17 mm or greater than or equal to 22 mm and the maximum twist pair pitch was twice or more the minimum twist pair pitch.

As described above, it was confirmed that in the PoE cable of the present disclosure, communication characteristics (a transmission rate of 1 Gbps at 200 meters) can be satisfied without a separator (a cross-filler) by applying the above-described condition for a twist pair pitch, thereby contributing to minimizing an outer diameter of the cable.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A power-over-Ethernet (POE) cable for connecting a power sourcing equipment and a power device and supplying power while establishing data communication, the PoE cable comprising:
 a plurality of pair units each formed by twisting a pair of conducting wires to have twist pair pitches, the pair of conducting wires including a conductor with a diameter of 0.59 to 0.61 millimeters (mm) and an insulator surrounding the conductor; and
 an outer jacket surrounding the plurality of pair units,
 wherein the plurality of pair units are twisted together to have a collective pitch,
 among the twist pair pitches of the plurality of pair units, a minimum twist pair pitch is in a range of 12 to 15 mm and a maximum twist pair pitch is twice or more the minimum twist pair pitch, and
 the PoE cable has an outer diameter of 6.2 mm or less,
 wherein, when the PoE cable is 200 meters (m) long, the pair of conducting wires has a conductor resistance of 12.5 Ohms ($\Omega$) or less, and power consumption of the PoE cable is 4.5 Watts (W) or less during transmission of power.

2. The PE cable of claim 1, wherein each of the plurality of pair units is in contact with a pair unit adjacent thereto.

3. The PoE cable of claim 1, wherein each of the pair of conducting wires of each of the plurality of pair units has an insulation outer diameter of 1.0 mm to 1.1 mm.

4. The PoE cable of claim 1, wherein an average twist pair pitch of each of the plurality of pair units is in a range of 17 mm to 22 mm.

5. The PoE cable of claim 1, wherein a collective pitch of the plurality of pair units is in a range of 80 mm to 120 mm.

* * * * *